J. F. LAMB.
ELECTRICAL COOKING APPARATUS.
APPLICATION FILED NOV. 16, 1915.
1,259,417.
Patented Mar. 12, 1918.
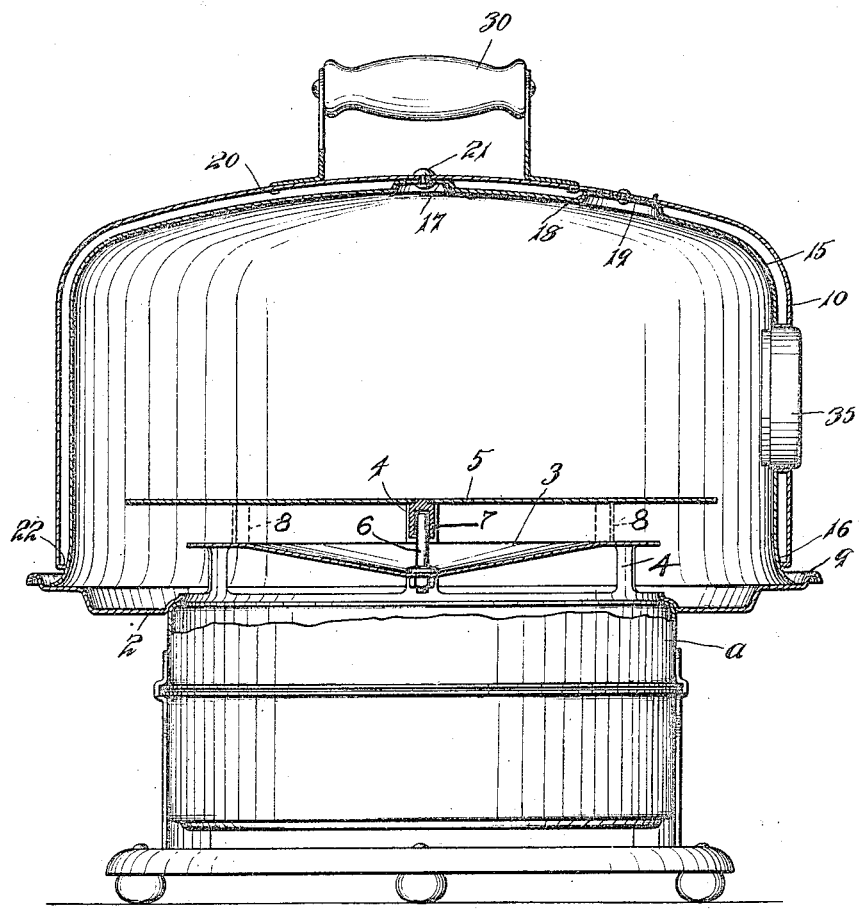
WITNESSES:
INVENTOR.
Joseph F. Lamb.
BY
ATTORNEY.

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICAL COOKING APPARATUS.

1,259,417.  Specification of Letters Patent.  Patented Mar. 12, 1918.

Application filed November 16, 1915. Serial No. 61,835.

*To all whom it may concern:*

Be it known that I, JOSEPH F. LAMB, a citizen of the United States, and a resident of New Britain, in the county of Hartford, State of Connecticut, have invented certain new and useful Improvements in Electrical Cooking Apparatus, of which the following is a specification.

This invention relates particularly to a device of the character of an oven adapted for use with an electrical heater for cooking purposes.

The drawing is a side elevation of a heater with the oven in position thereon and shown in central vertical section.

Referring to the drawing, $a$ denotes the heater, which may be of any desired shape or construction, here shown as being circular. The apparatus forming the subject matter of this invention comprises an annular channeled base 2, the inner raised edge of which fits onto the heater. Arranged above the central aperture is a heat deflector plate 3, preferably made integral with the annular base and carried by the upstanding legs 4. This deflector plate is by preference centrally depressed to deflect the heat to the sides. Above and spaced from the deflector plate but supported thereon as by the legs 8, is a supporting plate 5, upon which dishes containing the articles to be cooked may be placed. This supporting plate 5 is of greater diameter than the central aperture in the base, so that any overflow which occurs while the cooking is taking place will run down into the channeled base and be prevented from dropping onto the resistance wire of the heater, which might occasion serious damage.

To guard against the placing of dishes directly on the deflector plate, and the improper positioning of the supporting plate thereon, there is provided an upstanding pin 6 mounted at the center of the deflector plate and projecting above the plane of its upper surface. Centrally at the underside of the supporting plate is a socket 7 to receive the pin. The presence of the pin prevents the placing of dishes on the deflector plate, and prevents the placing of the supporting plate upside down. The pin and socket also act to hold the supporting plate against lateral displacement.

At its outer edge the base is provided with a raised laterally extending flange 9 to support the cover 10. This cover is a double-walled structure to provide an air space for heat insulation. The inner member 15 is slightly tapered at its lower edge as at 16, and flared to rest on the lateral flange 9. Centrally of the top it is recessed as at 17, to provide a bearing for the outer member 20, which is secured thereto as by a rivet 21. The inner member is also provided with an outstanding apertured hub 18, against the edges of which the outer member 20 fits, the latter being there apertured to provide ventilation for the interior of the cover and equipped with a shutter 19.

The outer member at its lower edge is inwardly flanged as at 22, to wedge against the tapered lower wall 16 of the inner member to provide a substantially air-tight joint. A handle 30 is conveniently secured to the outer member. In the side of the cover, extending through both walls, is a thermometer 35, to record the degree of heat being supplied.

The structure here illustrated and described is susceptible of various modifications without departing from the spirit of the invention as defined in the appended claims.

I claim as my invention:—

1. The combination with a heater casing, of an annular base fitting upon and supported at its inner edge by the top of said casing; integral upstanding legs at the inner edge of said base; a deflector plate supported by and integral with said legs; a lateral flange at the outer edge of said base, the central annular portion of said base being lower than the inner and outer edges; a supporting plate located above said deflector plate with its edge overhanging the depressed central portion of said base; and a cover supported on said lateral flange.

2. The combination with a heating case, of an annular base fitting upon and supported at its inner edge by the top of said casing; integral upstanding legs at the inner edge of said base; a deflector plate supported by and integral with said legs; a lateral flange at the outer edge of said base, the central annular portion of said base being lower than the inner and outer edges; a supporting plate located above said deflector plate with its edge overhanging the depressed central portion of said base; means on said deflector plate for spacing said supporting plate therefrom; and a cover supported on said lateral flange.

JOSEPH F. LAMB.

Witnesses:
A. W. KEMPTON,
D. M. SHEPARD.

Copies of this patent may be obtained for five cents each, by addressing the "Commissioner of Patents, Washington, D. C."